United States Patent
Chapman et al.

[11] Patent Number: 6,032,894
[45] Date of Patent: Mar. 7, 2000

[54] CARTRIDGE SPOOL SYSTEM FOR BAIT CAST FISHING REEL

[75] Inventors: John W. Chapman, Franksville; Christopher F. Kreuser, Kenosha, both of Wis.

[73] Assignee: Johnson Worldwide Assoicates, Inc., Sturtevant, Wis.

[21] Appl. No.: 09/078,795

[22] Filed: May 14, 1998

[51] Int. Cl.[7] .................................................. A01K 89/015
[52] U.S. Cl. ........................ 242/310; 242/314; 242/315; 242/318; 242/322
[58] Field of Search .................. 242/310, 314, 242/315, 318, 322

[56] References Cited

U.S. PATENT DOCUMENTS

| | | |
|---|---|---|
| 832,291 | 10/1906 | Bryant . |
| 3,614,015 | 10/1971 | Sussman . |
| 4,722,491 | 2/1988 | Myojo . |
| 4,770,362 | 9/1988 | Effinger . |
| 4,905,930 | 3/1990 | Puryear et al. . |
| 5,078,334 | 1/1992 | Zanon ..................................... 242/322 |
| 5,370,331 | 12/1994 | Sato . |
| 5,372,324 | 12/1994 | Sato . |
| 5,386,948 | 2/1995 | Sato . |
| 5,407,144 | 4/1995 | Ryall ...................................... 242/318 |
| 5,429,318 | 7/1995 | Sato . |
| 5,558,290 | 9/1996 | Sato . |
| 5,577,680 | 11/1996 | Ikuta . |
| 5,855,330 | 1/1999 | Kobayashi .............................. 242/310 |

*Primary Examiner*—Donald P. Walsh
*Attorney, Agent, or Firm*—Foley & Lardner

[57] ABSTRACT

A bait cast fishing reel includes a frame, a first side assembly disclosed on a first side of the frame and a second side assembly disclosed on a second side of the frame. The first side assembly includes a drive train. The second side assembly rotatably supports a spool shaft extending from the second side assembly to the first side of the frame and into releasable engagement with the drive train of the first side assembly. The second side assembly is separable from the frame to disengage an end of the spool shaft from the first side assembly so as to expose the end. The fishing reel further includes a spool having a center bore receiving the shaft, whereby the spool may be mounted onto the shaft or demounted from the shaft over the exposed end of the shaft.

21 Claims, 7 Drawing Sheets

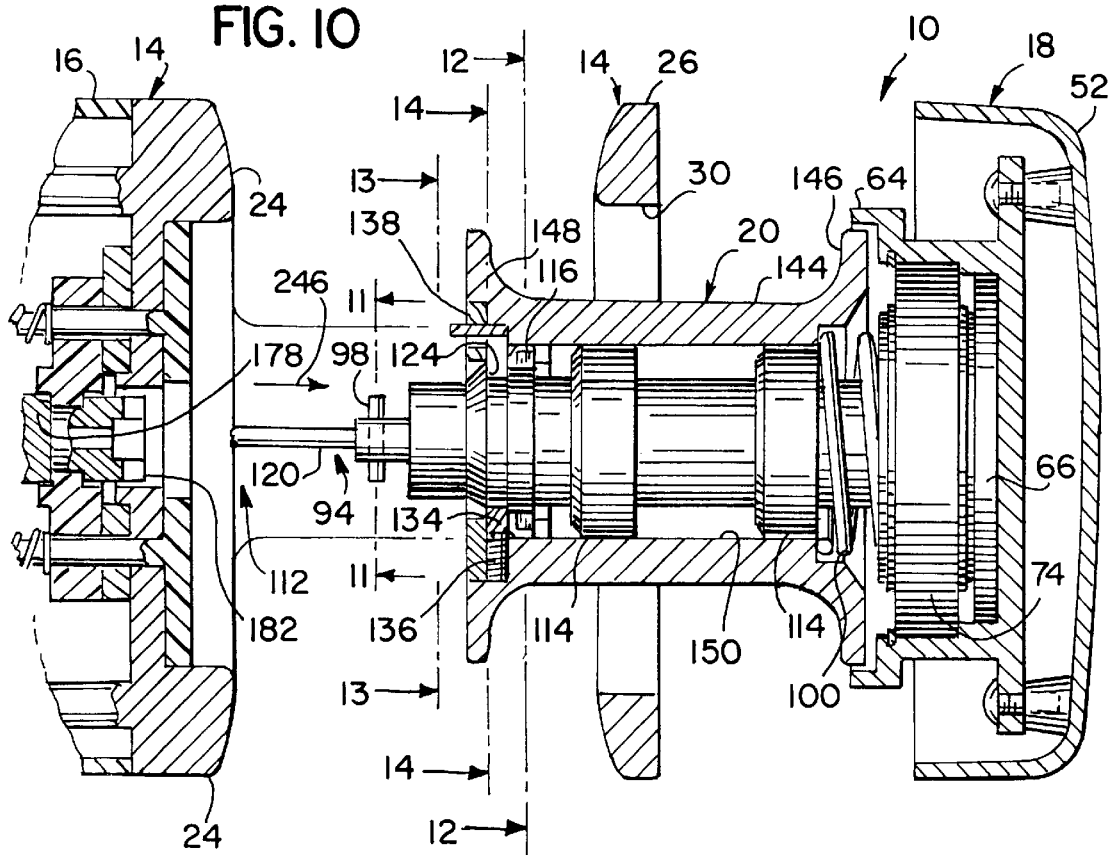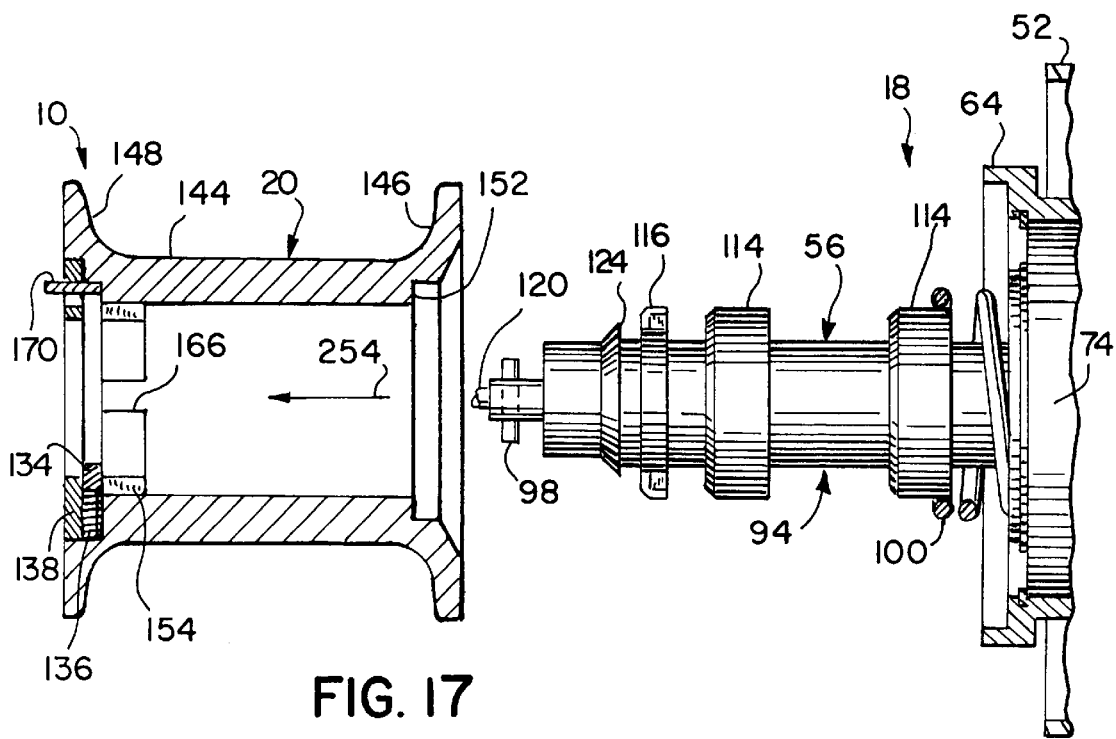

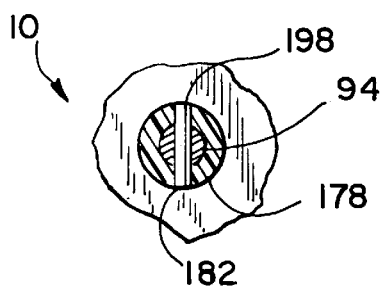
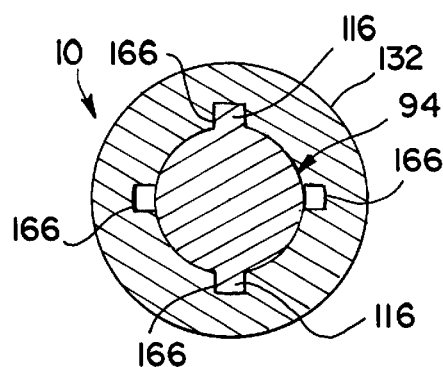
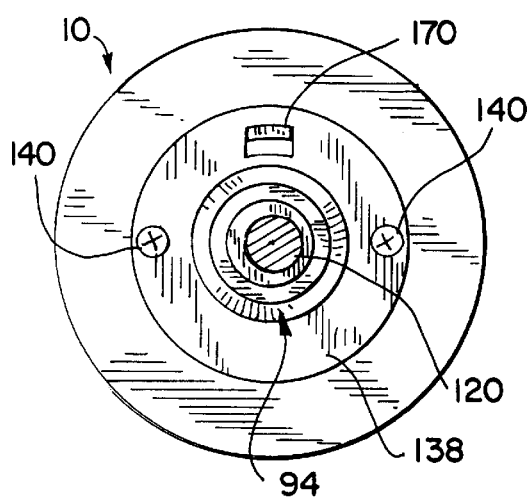
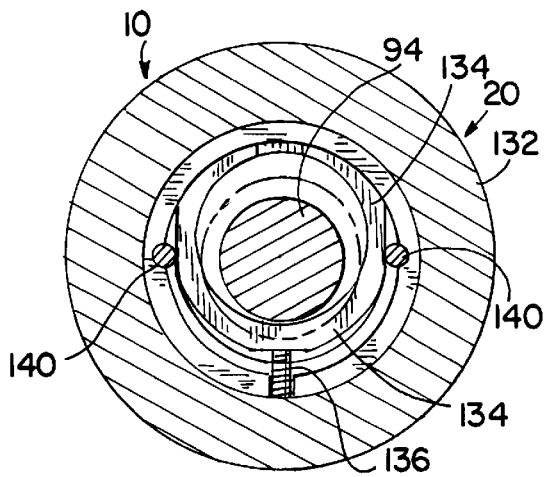
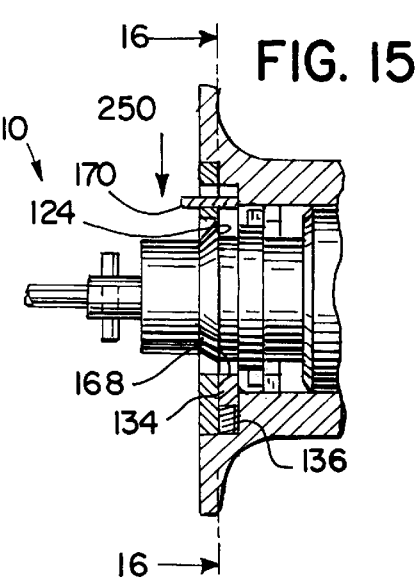
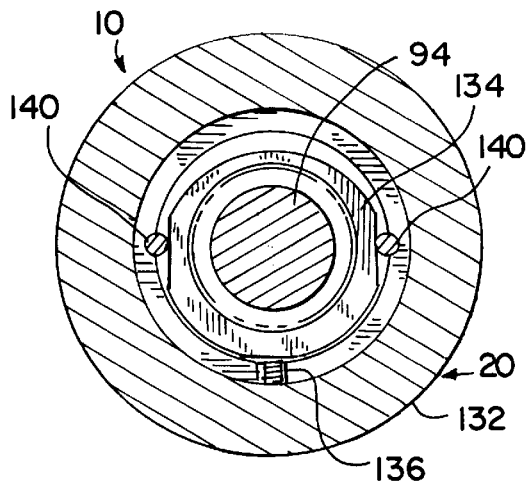

CARTRIDGE SPOOL SYSTEM FOR BAIT CAST FISHING REEL

FIELD OF THE INVENTION

The present invention relates to bait cast fishing reels. In particular, the present invention relates to a bait cast fishing reel having a side cover and a spool shaft which are removable from the fishing reel frame and a spool which is removably supported by the shaft.

BACKGROUND OF THE INVENTION

Bait cast fishing reels typically include a frame, first and second side assemblies supported on opposite sides of the frame and a spool rotatably supported between the first and second side assemblies. The first side assembly additionally supports a crank handle, which upon being rotated, drives a plurality of gears which are connected to the spool so as to rotate the spool about its axis. During the retrieval of fishing line, the crank handle is rotated to rotate the spool and thereby rewind the fishing line about the spool. During casting, the crank handle and drive train is disengaged from the spool by a conventionally known clutch which enables the spool to freely rotate and to release fishing line.

Bait cast fishing reels are used under a variety of different conditions and are used to catch a variety of different fish. As a result, it is often advantageous to use fishing line having a properly selected length and gauge best suited for the fishing conditions and the fish being sought. To do so, however, requires the person fishing to own and maintain several bait cast reels having different fishing line for different fish and conditions. Alternatively, the person fishing may replace the fishing line in the bait cast reel by unwinding the old fishing line and rewinding a new fishing line about the spool. Such a procedure is tedious and time consuming.

To facilitate the replacement of one type of fishing line with another type of fishing line in a bait cast reel, some bait cast reels include an openable and closeable lid mounted to the side body of the bait cast reel. Alternatively, the entire side body may be pivoted relative to the frame. Once the lid is opened or the side body is pivoted relative to the frame, both the spool and the shaft supporting the spool can be removed from the frame for replacement with a different spool and a different shaft supporting a different fishing line. Examples of such bait cast fishing reels are disclosed in Sato, U.S. Pat. No. 5,370,331 and Sato, U.S. Pat. No. 5,558,290.

As recognized in Sato, U.S. Pat. No. 5,558,290, once the side body is pivoted or the cover removed, the spool and its associated shaft may fall off the reel and drop into the water if the opening of the frame is inadvertently directed downward. As a result, Sato, U.S. Pat. No. 5,558,290 discloses a restricting device which engages the shaft of the spool to prevent movement of the spool towards the opening of the frame. Despite seemingly preventing the spool and its shaft from falling in the water once the opening of the frame is exposed by opening the lid or pivoting the side cover, the spool disclosed by Sato, U.S. Pat. No. 5,558,290 remains extremely difficult to grasp since the spool remains substantially surrounded by the frame prior to separation from the frame. Because the spool and its associated shaft are difficult to grasp and handle, the spool and its associated shaft are frequently dropped during the removal of the spool from the frame or while handling the spool after removal from the frame. In addition, moving the spool from the frame requires multiple manual manipulations by the person fishing. For example, first the person fishing must grasp the lid or side cover to open the lid or pivot the side cover. Second, the user must remove his or her hand from the lid or side cover and grasp the end of the spool shaft projecting from the side of the frame. Finally, the user must pull the spool and shaft from the frame, all while supporting the reel with his or her other hand.

In addition to being difficult to grasp and difficult to remove from the fishing reel frame, the spool is also expensive to manufacture. As a result, the cost of maintaining an inventory of different spools containing different types of fishing line to accommodate different fishing conditions and different target fish is high. Because each spool is permanently mounted to the shaft, removing and replacing the spool with a different spool requires that the entire spool, its shaft and any associated components, such as the braking mechanism, also be removed and replaced. As a result, the person fishing must maintain an inventory of spool assemblies which are heavier, more space consuming and more expensive.

Thus, there is a continuing need for a bait cast fishing reel having a removable spool which is easier to grasp and manipulate. There is also a continuing need for a removable spool which is simpler and less expensive to manufacture as well as maintain an inventory thereof.

SUMMARY OF THE INVENTION

The present invention is directed to a bait cast fishing reel including a frame having a first side, a second side spaced from the first side and a bridge interconnecting the first side and the second side. The reel further includes a first side assembly disposed on the first side of the frame having a drive train and a second side assembly disposed on the second side of the frame. The second side assembly rotatably supports a spool shaft extending from the second side assembly to the first side and into releasable engagement with the drive train of the first side assembly. The second side assembly is separable from the frame to disengage the spool shaft from the drive train of the first side assembly.

According to one aspect of the present invention, the fishing reel additionally includes a spool removably supported about the shaft. The reel preferably includes means for releasably and axially securing the spool on the shaft. In one embodiment, the spool includes a tubular member having a central bore axially extending therethrough wherein the central bore is sized to removably receive the shaft. The reel further includes a first shaft engaging surface extending from the tubular member in a direction oblique to the axis of the bore so as to engage the shaft to axially retain the spool on the shaft and a second shaft engaging surface extending in a direction non-perpendicular to the axis of the bore so as to engage the shaft to prevent rotation of the spool about the shaft.

According to yet another aspect of the present invention, the fishing reel includes a female portion on a first one of the spool on the shaft and a male portion on a second one of the spool on the shaft. The female portion and the male portion are moveable relative to one another between an engaged position and a disengaged position. Preferably, the female and male portions are resiliently biased into the engaged position. The fishing reel also preferably includes a manually operable lever coupled to one of the male and female members to move one of the male and female members between the engaged and disengaged position.

The present invention is also directed to a bait cast fishing reel including a spool shaft having a first end and a second end, first and second side assemblies rotatably supporting the first and second ends of the shaft, respectively, wherein the second side assembly is moveable relative to the second end to expose the second end and a spool having a central bore receiving the shaft. The spool may be mounted onto the shaft or demounted from the shaft over the second end of the shaft.

The present invention is also directed to a spool for a bait cast fishing reel having a shaft. The spool includes a tubular member having a central bore extending along an axis therethrough. The central bore is sized to removably receive the shaft of the reel. The spool further includes a first shaft engaging surface extending from the tubular member in a direction oblique to the axis so as to engage the shaft to axially retain the spool on the shaft. The spool also includes a second shaft engaging surface extending in a direction non-perpendicular to the axis of the bore so as to engage the shaft to prevent rotation of the spool about the shaft.

BRIEF DESCRIPTION OF THE DRAWINGS

FIG. 10 is a fragmentary sectional view of the reel of FIG. 1 taken along lines 3—3 illustrating the removable side assembly and associated spool separated from the reel.

FIG. 11 is a sectional view of the reel of FIG. 10 taken along lines 11—11.

FIG. 12 is a sectional view of the reel of FIG. 10 taken along lines 12—12.

FIG. 13 is a side elevational view of the reel of FIG. 10 taken along lines 13—13.

FIG. 14 is a sectional view of the reel of FIG. 10 taken along lines 14—14 illustrating a spool assembly axially retained upon a shaft assembly of the removable side assembly.

FIG. 15 is an enlarged fragmentary side elevational view of the reel of FIG. 10 with portions of the spool assembly shown in section and with the spool assembly being actuated to facilitate removal of the spool assembly from the shaft assembly.

FIG. 16 is a sectional view of the spool assembly and the shaft assembly of FIG. 15 taken along lines 16—16.

FIG. 17 is an enlarged fragmentary elevational view of the spool assembly being removed from the shaft assembly, with portions of the spool assembly being shown in section.

DETAILED DESCRIPTION OF THE PREFERRED EMBODIMENTS

Figure 1:
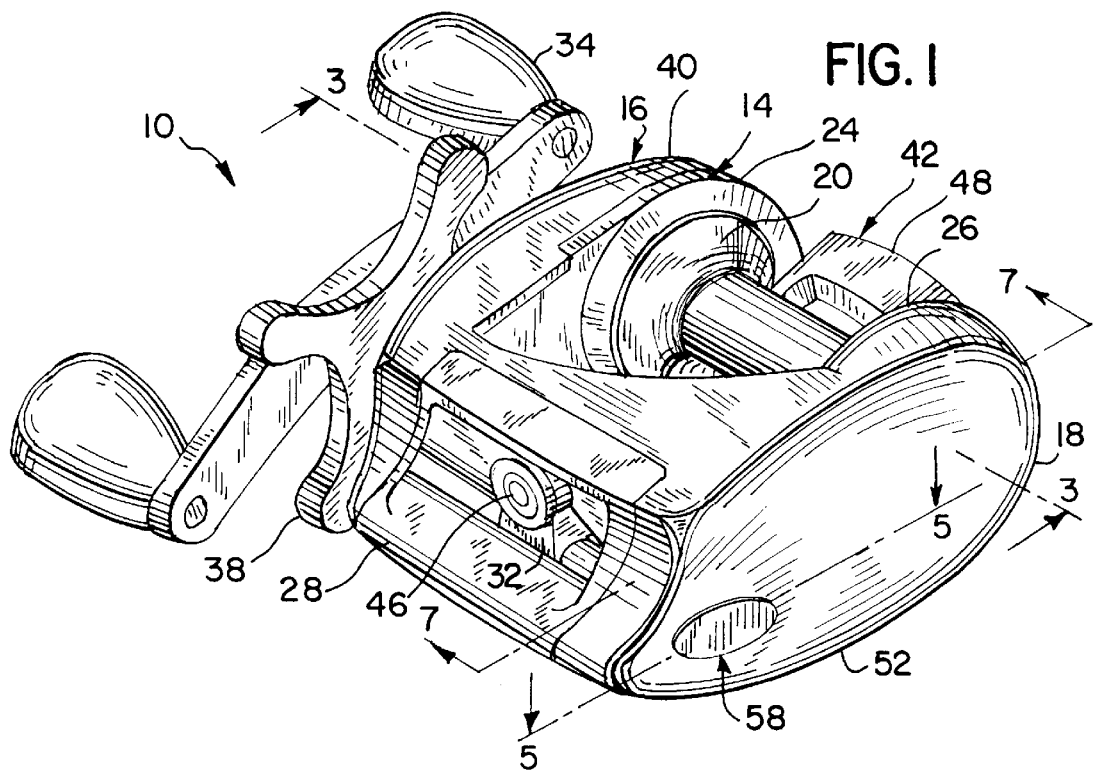
FIG. 1 is a top perspective view of a bait cast fishing reel including an exemplary removable side assembly and associated spool.

FIG. 1 is a perspective view of a bait cast fishing reel 10 which generally includes a main side assembly 16, removable side assembly 18 and spool assembly 20. Frame 14 generally includes a first side 24, a second side 26 spaced from the first side and at least one strut or bridge 28 interconnecting side 24 to side 26. First side 24 of frame 14 support main side assembly 16 while second side 26 of frame 14 removably supports side assembly 18. Second side 26 of frame 14 includes an opening 30 through which side assembly 18 and spool assembly 20 may be removed and separated from frame 14 and main side assembly 16. Frame 14 provides a base structure to which side assemblies 16 and 18 are mounted and supported. As will be appreciated, frame 14 may have a variety of different sizes, shapes and configurations depending upon the particular size and configuration of reel 10.

Main side assembly 16 is substantially disposed on side 24 of frame 14 and includes line guide 32, crank 34, drive means 36 (shown in FIGS. 3 and 4), cast control 37 (shown in FIG. 3), drag control 38, drag means (not shown), side cover 40 and clutch 42.

Line guide 32 extends at a forward end of reel 10. Line guide 32 is conventionally known and includes an opening 46 through which the fishing line is threaded. Upon being driven by crank 34 and drive means 36, line guide 32 reciprocates from side to side of frame 14 during rotation of spool assembly 20 and during the retrieval of fishing line to evenly distribute the fishing line across the width of spool assembly 20.

Crank 34 is operably coupled to drive means 36 to extend between crank 34 and spool assembly 20 and line guide 32. Drive means 36 transmits the torque from rotation of crank 34, through appropriate gear reduction stages, to rotate spool assembly 20 to retrieve fishing line. Drive means 36 further transmit the torque from the rotation of crank 34 to line guide 32 to reciprocally drive line guide 32.

The drag means (not shown) is conventionally known and is operably coupled to spool assembly 20. The drive means retards the rotation of spool assembly 20 and the corresponding release of fishing line from spool assembly 20 in a conventionally known manner when clutch 42 is engaged. The extent to which the drag means retards rotation of spool assembly 20 is adjusted by drag control 38.

Side cover 40 comprises a relatively thin, elongate housing configured to be attached to side 24 of frame 14 about drive means 36, the drag means and components of clutch 42. The exact configuration of side cover 40 may vary depending upon size and configuration of frame 14, drive means 36, the drag means, crank 34 and drag control 38.

Clutch 42 is conventionally known and is supported between sides 24 and 26 of frame 14. Clutch 42 is operably coupled between drive means 36, the drag means and spool assembly 20. Clutch 42 includes a clutch thumb bar or lever 48 which engages and disengages clutch 42. When clutch 42 is engaged, the spool drive means 36 and the drag means are operably coupled to spool assembly 20. As a result, rotation of handle or crank 34 rotates spool assembly 20 to retrieve fishing line. At the same time, the drag mechanism retards reverse rotation of spool assembly 20 to release the fishing line. Depressment of clutch lever 48 disengages clutch 42 to uncouple spool assembly 20 from spool drive means 36 and the drag means. As a result, spool assembly 20 is substantially free to rotate in the reverse direction to release fishing line, such as during casting.

Removable side assembly 18 is substantially disposed adjacent to side 26 of frame 14 opposite main side assembly 16. Side assembly 18 supports spool assembly 20 and is separable from frame 14 and the remainder of fishing reel 10 such that fishing reel 10 may be used with the plurality of interchangeable side assemblies 18 supporting differently sized spool assemblies 20 as well as different fishing line.

Figure 3:
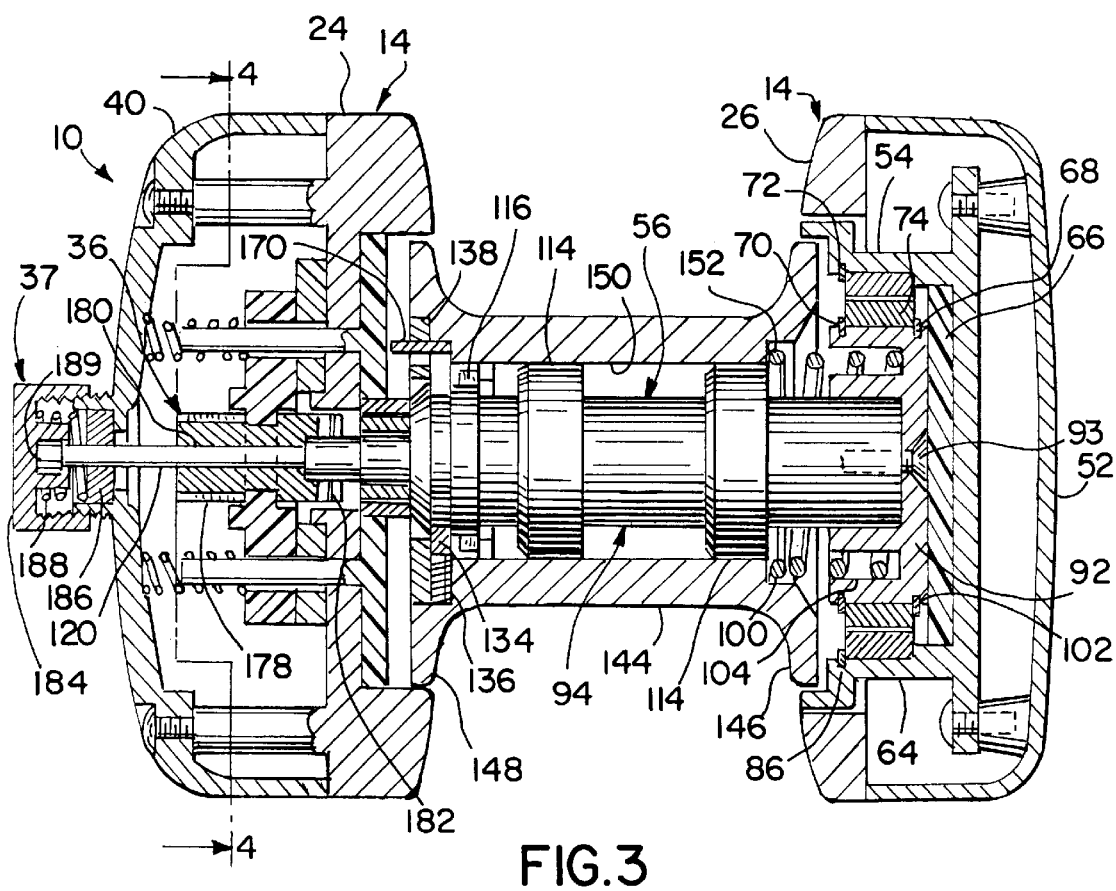
FIG. 3 is a sectional view of the bait cast fishing reel of FIG. 1 taken along lines 3—3 illustrating the removable side assembly and associated spool mounted to the reel.
Figure 2:
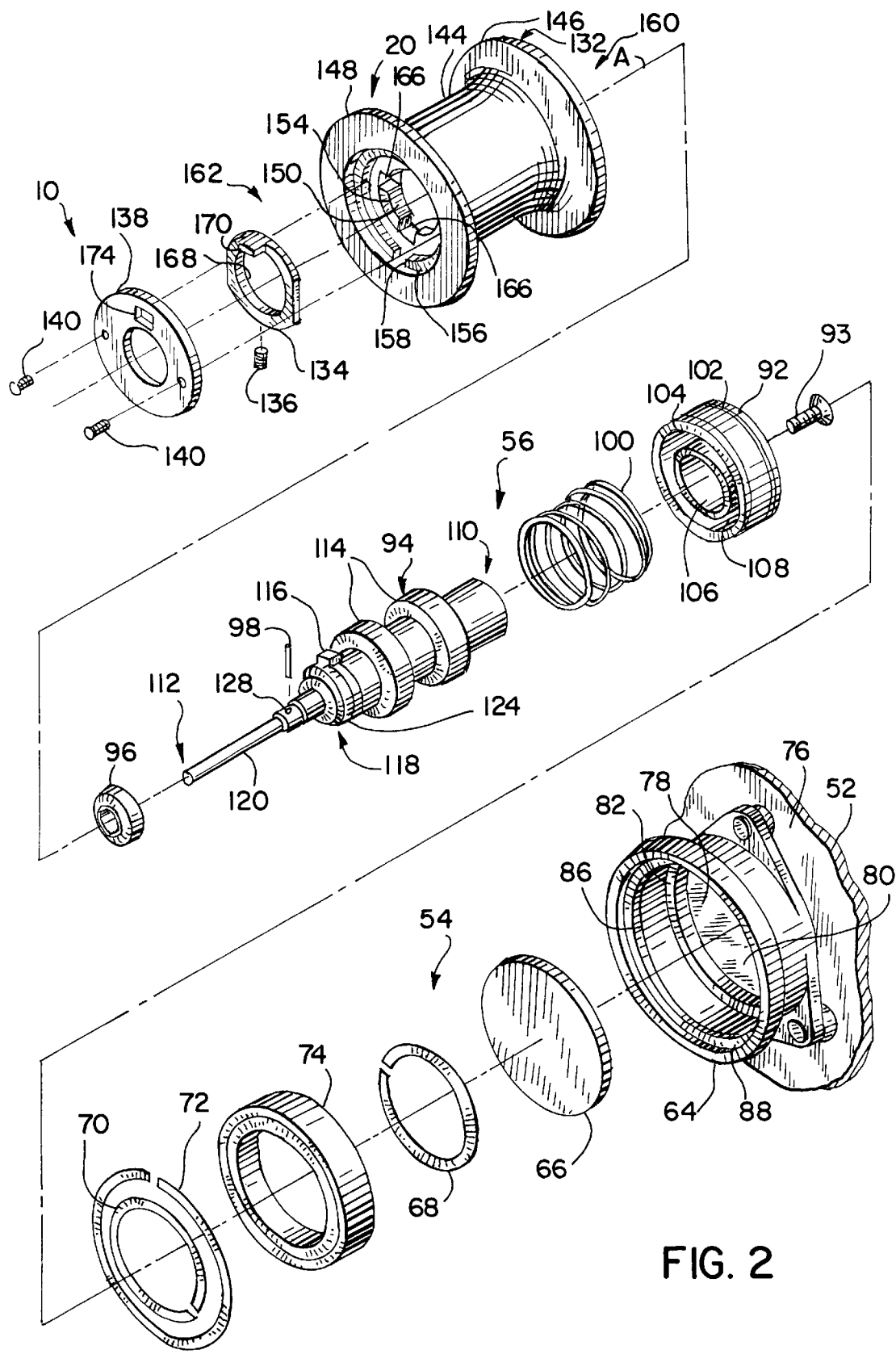
FIG. 2 is an enlarged exploded view of the removable side assembly and associated spool of the bait cast reel of FIG. 1.

FIGS. 2 and 3 illustrate bearing support assembly 54, spool assembly 56 and spool assembly 20 in greater detail. FIG. 2 is an exploded perspective view of bearing support assembly 54, spool shaft assembly 56 and spool assembly 20. FIG. 3 is a sectional view of fishing reel 10 taken along lines 3—3 of FIG. 1 illustrating side assembly 18 mounted to main side assembly 16. Side assembly 18 generally includes the side cover 52, bearing support assembly 54 (shown in FIG. 3), spool shaft assembly 56 (shown in FIG. 3), rotational locking mechanism 58 (shown in FIGS. 5–9), and axial locking mechanism 60 (shown in FIGS. 5–9). Side cover 52 is generally configured to mate and abut against side 26 of frame 14. Side cover 52 houses and encloses bearing support assembly 54, axial locking mechanism 58, rotational locking mechanism 60 and a portion of spool shaft assembly 56. In addition, side cover 52 provides an outer surface against which fishing reel 10 is gripped and held by the person fishing. Side cover 52 further supports bearing support assembly 54 which rotatably supports spool shaft assembly 56.

Bearing support assembly 54 generally includes bearing support 64, bearing disk 66, bearing retainers 68, 70 and 72, and bearing 74. Bearing support 64 supports bearing support assembly 54 relative to side cover 52. Bearing support 64 is affixed to inner surface 76 of side cover 52 and defines a generally hollow cavity 78 sized for receiving and partially enclosing bearing disk 66, bearing 74 and an axial end of spool shaft assembly 56. Cavity 78 of bearing support 64 includes a bottom surface 80, shoulder 82, groove 86 and shoulder 88. Bottom surface 80 supports bearing disk 66. Shoulder 82 circumferentially extends about cavity 78 and is sized for supporting bearing 74. Groove 86 circumferentially extends into support 64 about cavity 78 and is sized for proportionally receiving retainer 72. Shoulder 88 circumferentially extends about cavity 78 and provides a surface for limiting axial movement of spool assembly 20 upon shaft assembly 56.

Bearing disk 66 is a generally flat circular disk of low friction material, such as polytetraflouroethylene (TEFLON) which is fitted against bottom surface 78 within bearing support 64. Bearing disk 66 bears against an axial end against spool shaft assembly 56 to facilitate rotation of spool shaft assembly 56 relative to bearing support 64.

Retainers 68, 70 and 72 axially retain bearing 74 relative to spool shaft assembly 56 and bearing support 64. Each of retainers 68, 70 and 72 preferably comprise conventionally known snap rings. Retainers 68 and 70 extend along opposite sides of bearing 74 to axially retain bearing 74 relative to an axial end of spool shaft assembly 56. Retainer 72 mounts within groove 86 to axially capture bearing 74 against shoulder 82.

Bearing 74 is axially fixed in place between bearing support 64 and an axial end of spool shaft assembly 56. Bearing 74 rotatably supports the axial end of spool shaft 94 relative to bearing support 64 and side cover 52. In the exemplary embodiment, bearing 74 comprises a conventionally known roller bearing. As will be appreciated, bearing 74 may comprise various other well-known bearing structures, including bushings, individual ball bearings, needle bearings, or structures formed from low-friction materials and the like, which rotatably support one member relative to another.

Spool shaft assembly 56 supports spool assembly 20 and generally includes end cap 92, fastener 93, spool shaft 94, bearing 96, pin 98 and spring 100. End cap 92 comprises a support structure affixed to spool shaft 94. In the exemplary embodiment illustrated, end cap 92 is affixed to spool shaft 94 by fastener 93. Alternatively, end cap 92 may be integrally formed with spool shaft 94 or may be affixed by other means, such as adhesive or various other fasteners. End cap 92 includes grooves 102, 104, central cavity 106 and annular cavity 108. Grooves 102 and 104 extend about the outer circumference of end cap 92 and receive retainers 68 and 70 to axially retain end cap 92 and bearing 74 relative to one another. Central cavity 106 receives spool shaft 94. Annular cavity 108 extends about central cavity 106 and receives a portion of spring 100. Although not illustrated, end cap 92 may additionally be provided with a conventionally known centrifical braking mechanism to control backlash during casting.

Spool shaft 94 generally comprises an elongate cylindrical rod or axle configured to fit into spool assembly 20. Spool shaft 94 is also configured to be non-rotatably coupled to spool assembly 20 and to be selectively removed and separated from spool assembly 20. Spool shaft 94 generally includes ends 110, 112, outer spool support surfaces 114, spool rotational locking structure 116, spool axially locking structure 118, and engagement pin 120. Outer spool supporting surfaces 114 circumferentially extend about shaft 94 intermediate ends 110 and 112. As best shown by FIG. 3, surfaces 114 engage inner circumferential surfaces of spool assembly 20 to support spool assembly 20 thereabout.

Spool rotational locking structure 116 preferably comprises a radially projecting key configured to mate within the correspondingly configured key way formed along the inner circumferential surface of spool assembly 20. As a result, structure 116 prevents relative rotation of spool assembly 20 relative to spool shaft 94 while enabling axial movement of spool assembly 20 relative to spool shaft 94. As will be appreciated, various other structures may be used to non-rotatably couple spool assembly 20 to spool shaft 94. For example, spool assembly 20 may alternatively include a radially projecting key while spool shaft 94 includes a correspondingly configured key way.

Axial locking structure 118 axially secures and retains spool assembly 20 on spool shaft 94. In the exemplary embodiment illustrated, locking structure 118 comprising an outer circumferential groove 124 concentrically extending about the axis of spool shaft 94 proximate end 112. Groove 124 provides a female structure for receiving a corresponding male structure of spool assembly 20. As will be described in greater detail hereafter, locking structure 118 enables spool assembly 20 to be selectively removed from spool shaft 94 for replacement of spool assembly 20. As will be appreciated, locking structure 118 may comprise various other mechanisms for axially securing spool assembly 20 upon shaft 94 while also enabling spool assembly 20 to be selectively removed from shaft 94.

Pin 98 extends through bore 128 so as to radially project from shaft 94 proximate end 112. Pin 98 provides surfaces which non-parallel extend from the axis of shaft 94 for releasably engaging drive means 36 as shown in FIG. 3. Alternatively, various other structures may be utilized for nonrotatably coupling spool shaft 94 to drive means 36 while also enabling spool shaft 94 to be axially moved relative to drive means 36 such that side assembly 18 and spool assembly may be separated from the main side assembly 16 and drive means 36. For example, pin 98 may be integrally formed as part of shaft 94. In addition, shaft 94 20 may have other noncircular shapes so as to be keyed to drive means 36.

Engagement pin 120 axially projects along end 112 of spool shaft 94. As shown in FIG. 3, engagement pin 120 extends through drive means 36 into releasable engagement with cast control 37.

As best shown by FIG. 3, bearing 96 comprises a conventionally known roller bearing positioned about spool shaft 94. Bearing 96 rotatably supports end 112 relative to side 24 of frame 14. As with pin 98 and engagement pin 120, bearing 96 is also axially moveable relative to side 24 of frame 14 and main side assembly 16 to facilitate axial separation of removable side assembly 18 and spool assembly 20.

Spring 100 comprises a conventionally known coil spring fitted within annular groove 108 of end cap 92. Spring 100 has a diameter greater than spool shaft 94 but less than the outer diameter of spool assembly 20. Spring 100 resiliently biases spool assembly 20 towards end 112 of spool shaft 94. As a result, spring 100 forcefully ejects spool assembly 20 off of spool shaft 94 once spool assembly 20 is axially unlocked relative to spool shaft 94. As will be appreciated, various other mechanisms may be used to resiliently bias spool assembly 20 towards end 112 of spool shaft 94.

Spool assembly 20 generally includes spool 132, releasable locking member 134, resilient element 136, support disc 138 and fasteners 140. Spool 132 includes an elongate axially extending hub 144 to provide flanges 146, 148, shaft receiving bore 150, shoulder 152, wall 154, shoulder 156 and recess 158. Hub 144 is a generally elongate tubular member longitudinally extending along an axis A and having an outer circumferential surface for supporting fishing line between flanges 146 and 148. Flanges 146 and 148 are located at ends 160 and 162, respectively, of spool 132 and extend radially outwardly from the outer circumferential surface of hub 144 to retain fishing line about hub 144. Bore 150 axially extends through spool 132 from end 162 and 162. Bore 150 is sized for receiving spool shaft 94. Shoulder 152 (best seen in FIG. 3), extends about bore 150 at end 160. Shoulder 152 receives spring 100 and retains spring 100 relative to spool 132. Wall 154 projects radially inwardly from hub 144 at end 162. Wall 154 defines four equidistantly spaced notches or keyways 166 configured to receive rotationally locking structure 116 of spool shaft 94. As a result, keyways 166 and structure 116 cooperate to nonrotatably couple spool 132 and shaft 94 to one another.

Shoulder 156 circumferentially extends about bore 150 and is axially spaced from wall 154. Shoulder 156 supports support disc 138 at a space and location relative to wall 154 so as to capture movable locking member 134 therebetween. Recess 158 extends between shoulder surface 156 and sized for receiving resilient element 136.

Movable locking member 134 preferably comprises an annular ring having an outer perimeter sized to fit against wall 154 and an inner diameter sized to receive at least a portion of spool shaft 94. Movable locking member 134 additionally includes non-parallel extending lever 170 to facilitate manual movement of member 134.

Resilient element 136 preferably comprises a coil spring fit within recess 158 in engagement with movable member 134. Resilient element 136 resiliently biases movable locking member 134 towards a locking position in which opening 168 of member 134 is eccentrically positioned about axis A. Movement of member 134 by lever 170 against the biasing force of element 136 moves member 134 out of groove 124 such that spool assembly 20 may be axially moved past axial locking structure 118 to remove spool 132 from shaft 94. In the eccentric position, member 134 projects into groove 124 of shaft 94 to axially retain spool 132 on shaft 94.

Support plate 138 retains movable locking member 134 within spool 132. Support plate 138 preferably comprises a circular disc configured to abut against shoulder 156. Support 138 is secured to spool 132 by fasteners 140 and includes an opening 174 through which lever 170 projects for manual actuation of member 134. Movable locking member 134 provides a male portion which engages groove 124, a female portion, to axially lock spool 132 onto spool shaft 94. Alternatively, spool assembly 20 may include a female portion which is movable into engagement with a male portion supported by shaft 94. Moreover, in lieu of spool assembly 20 supporting a movable locking member, shaft 94 may alternatively include a movable locking member.

Figure 4:
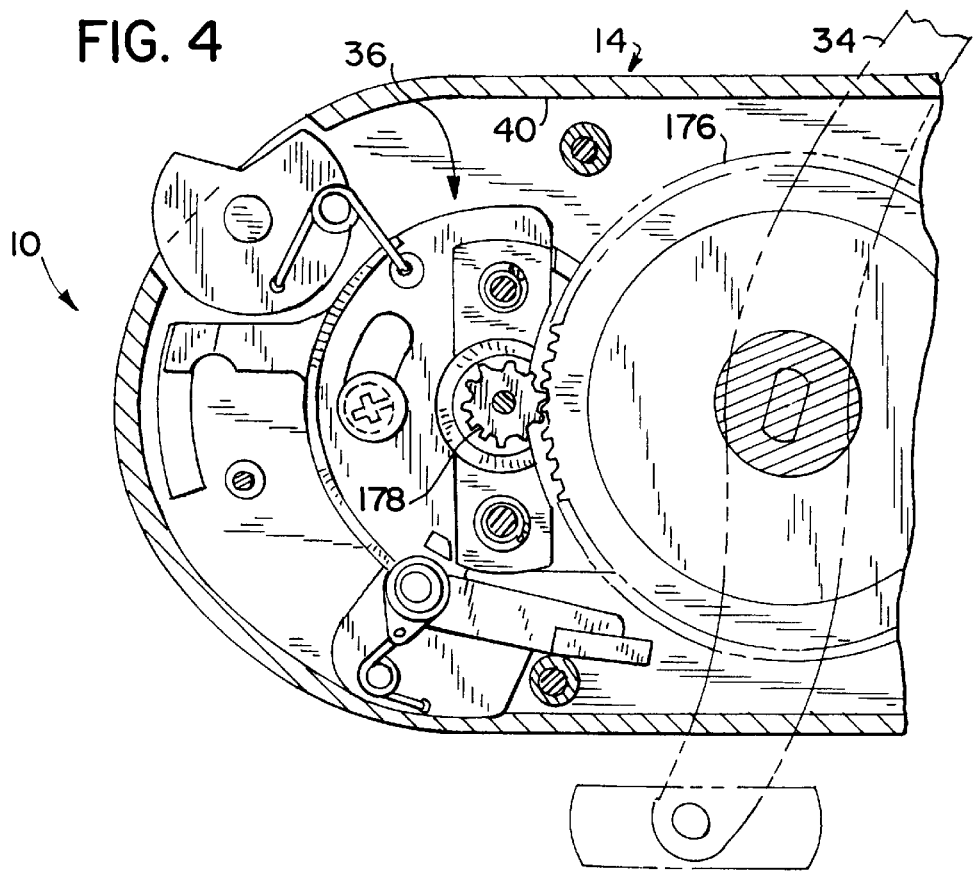
FIG. 4 is a sectional view of the bait cast fishing reel of FIG. 3 taken along lines 4—4.

FIGS. 3 and 4 illustrate drive means 36 and cast control 37 in greater detail. As best shown by FIG. 4, drive means 36 generally comprises a drive train including gears 176, 178. Gear 176 nonrotatably coupled to crank 34 and includes outer circumferential teeth intermeshed with responding outer circumferential teeth of gear 178. As shown by FIG. 3, gear 178 is rotatably supported relative to side 24 of frame 14 and includes an axially extending bore 180 and a radially extending channel 182. Bore 180 extends through gear 178 and is sized for slidably receiving engagement pin 120 of spool shaft 94. Bore 180 enables engagement pin 120 to project through gear 178 into engagement with cast control 37. Channel 182 is generally sized for receiving pin 98 to nonrotatably couple shaft 94 to gear 178 and the drive train of drive means 36. As a result, rotation of gear 178 by gear 176 and crank 34 rotates shaft 94 and spool 132 to retrieve fishing line. At the same time, channel 182 enables spool shaft 94 to be axially removed from gear 178 as well as side assembly 16.

As best shown by FIG. 3, drag control 37 generally includes adjustment knob 184, bearing 186 and spring 188. Adjustment knob 184 threadably engages an outer threaded portion of side cover 40. Adjustment knob 184 receives an end of engagement pin 120 and includes a shim and rubber 189 which engage pin 120. Spring 188 encircles the end of engagement pin 120 and resiliently biases knob 184 away from pin 120. Bearing 182 is fitted to side cover 40 and rotatably supports engagement pin 120. Rotation of adjustment knob 184 varies the compression applied to engagement pin 120. As a result, rotation of adjustment knob 184 varies the resistance of spool shaft 94 against rotation about its axis. Similar to drive means 36, cast control 37 is releasably coupled to engagement pin 120 of shaft 94 such that side assembly 18 and its shaft 94 carrying spool assembly 20 may be separated and removed from main side assembly 16 for replacement.

Figure 5:
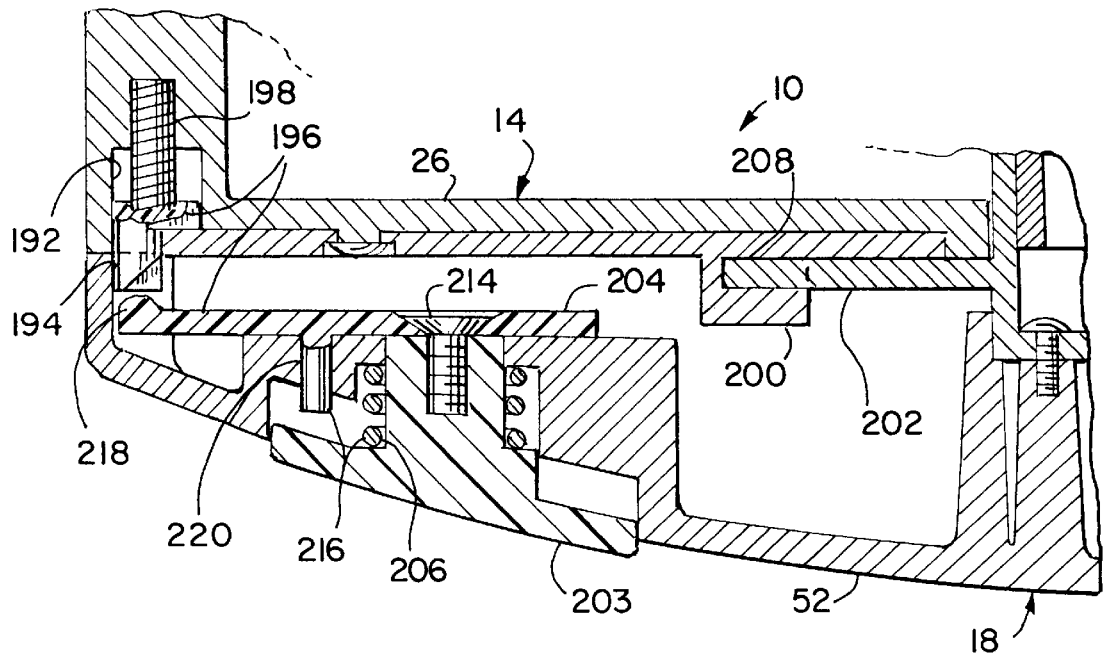
FIG. 5 is an enlarged fragmentary sectional view of the bait cast fishing reel of FIG. 1 taken along lines 5—5.
Figure 6:
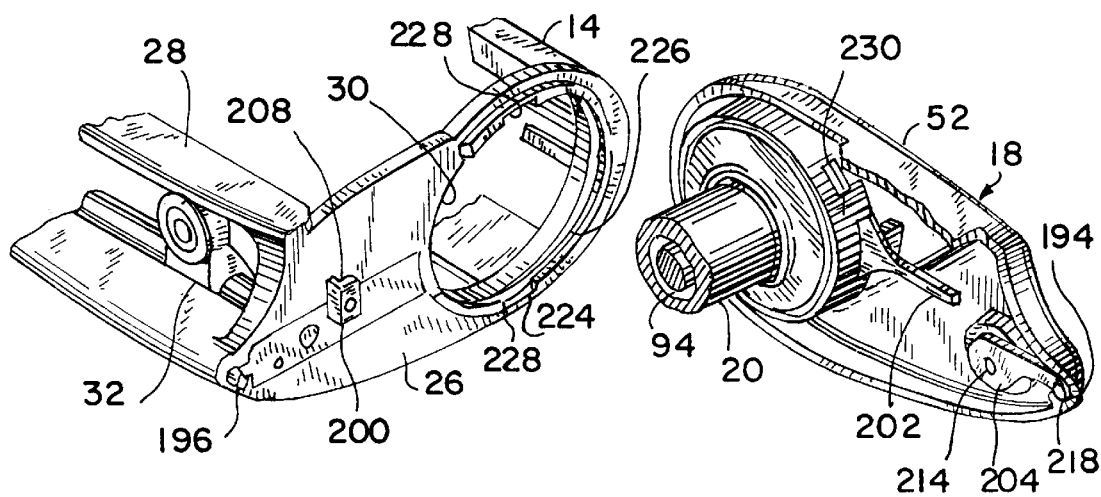
FIG. 6 is an exploded fragmentary perspective view of the bait cast fishing reel of FIG. 1 illustrating the removable side cover and associated spool separated from the reel.

FIGS. 5–9 illustrate rotational locking mechanism 58 and axially locking mechanism 60 in greater detail. As best shown by FIGS. 5 and 6, rotational locking mechanism 58 generally includes cavity 192, detent 194, pin 196, carrier guide 200, carrier 202, push button 203, arm 204 and resilient element 206. Cavity 192 is a recess extending into side 26 of frame 14. Cavity 192 is generally positioned in alignment with detent 194. Cavity 192 is sized for receiving pin 196 and resilient element 198. Detent 194 is a recess projecting into side cover 52 opposite to and in general alignment with cavity 192. Detent 192 is sized for receiving at least a portion of pin 196. Detent 194 is configured so as to engage pin 196 to prevent relative movement of side cover 52 relative to side 26 of frame 14.

Pin 196 is an elongate member captured within cavity 192 by carrier guide 200 which is mounted to side 26 of frame 14. Pin 196 moves between an extended position (shown in FIG. 5) in which pin 196 projects into detent 194 to retain side cover 52 relative to frame 14 and a retracted position (not shown) in which pin 196 is removed from detent 194 to permit rotation of side cover 52 relative to frame 14. Pin 196 is preferably resiliently biased into the extended position by resilient element 198 also received within cavity 192. Resilient element 198 preferably comprises a coil spring. As will be appreciated, various other types of springs or resilient members may be used to resilient bias pin 196 into the extended position.

To facilitate alignment of detent 194 with pin 196 and to maintain side cover 52 adjacent to side 26 of frame 14, reel 10 additionally includes carrier guide 200 and carrier 202. Carrier guide 200 is mounted to side 26 of frame 14 and defines an elongate channel 208 having a bottom 210 sized to receive carrier 202. Carrier 202 is affixed to side cover 52 so as to rotate with side cover 52 into and out of channel 208. Carrier 202 cooperates with carrier guide 200 to align detent 194 adjacent to pin 196 and to further retain side cover 52 adjacent to frame 14.

Push button 203, arm 204, and resilient element 206, upon being actuated, move pin 196 out of detent 194 into the retracted position. Push button 203 extends through side cover 52 and is fixedly coupled to arm 204 by fastener 214. Alternatively, push button 203 may be affixed to arm 204 by various other fastening means or may be integrally formed therewith.

Arm 204 extends from push button 203 towards detent 194 and includes guide 216 and head 218. Guide 216 comprises an elongate integrally formed pin slidably extending through a corresponding bore 220 in side cover 52. Guide 216 guides movement of arm 204 toward and away from frame 14. Head 218 is located at an end of arm 204 opposite pin 196. Resilient element 206 comprises a spring captured between side cover 52 and push button 203. Resilient element 206 resiliently biases push button 203 and arm 204 outward away from frame 14 and pin 196. Inward depressment of push button 203 compresses resilient element 206 and moves arm 204 towards frame 14 such that head 218 moves pin 196 against resilient element 198 out of detent 194 such that side cover 52 may be rotated relative to frame 14.

As best shown by FIG. 6, axial locking mechanism 60 generally includes rail 224, channel 226, openings 228 and bayonet tabs 230. Rail 224 extends along side 26 of frame 14 about opening 30. Rail 224 assigns channel 226. Channel 226 is defined between channel 226 and frame 14. Channel 226 encircles opening 30 and is sized for slidably receiving bayonet tab 230. Openings 228 extend through rail 224 and define locations at which bayonet tabs 230 may be inserted into channel 226.

Bayonet tabs 230 are fixedly coupled to side cover 52 and radially project away from the axis of spool shaft 94. Bayonet tabs 230 are configured to be inserted through openings 228 and to further be rotated within channel 226 such that bayonet tabs 230 are captured between frame 14 and channel 226 to retain side cover 52 against frame 14.

Figure 7:
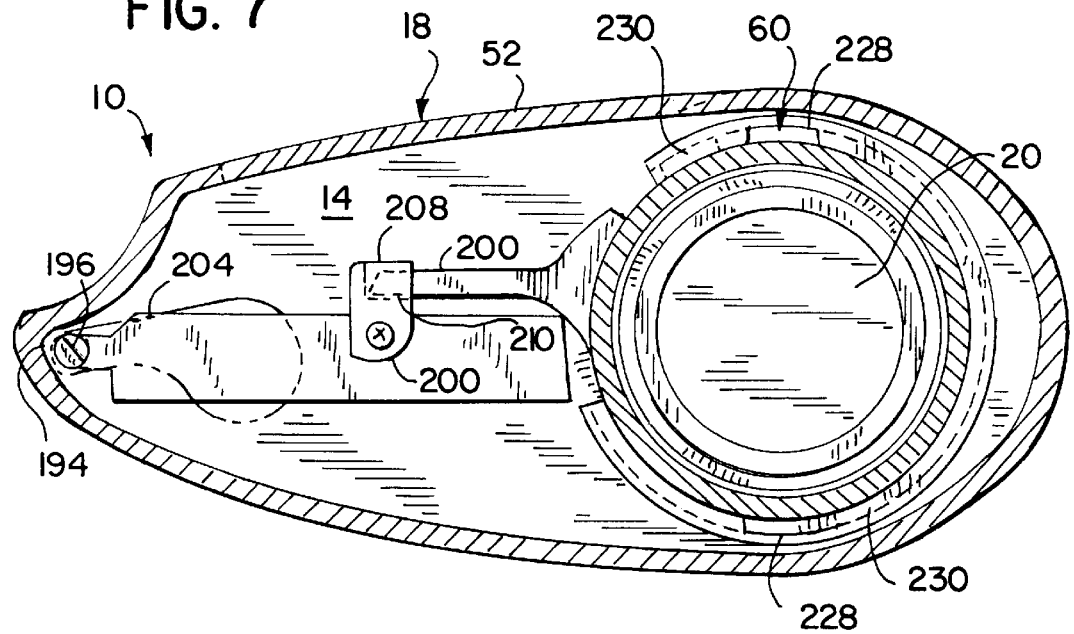
FIG. 7 is a sectional view of FIG. 1 taken along lines 7—7 illustrating the removable side assembly and associated spool in locking engagement with the reel.
Figure 8:
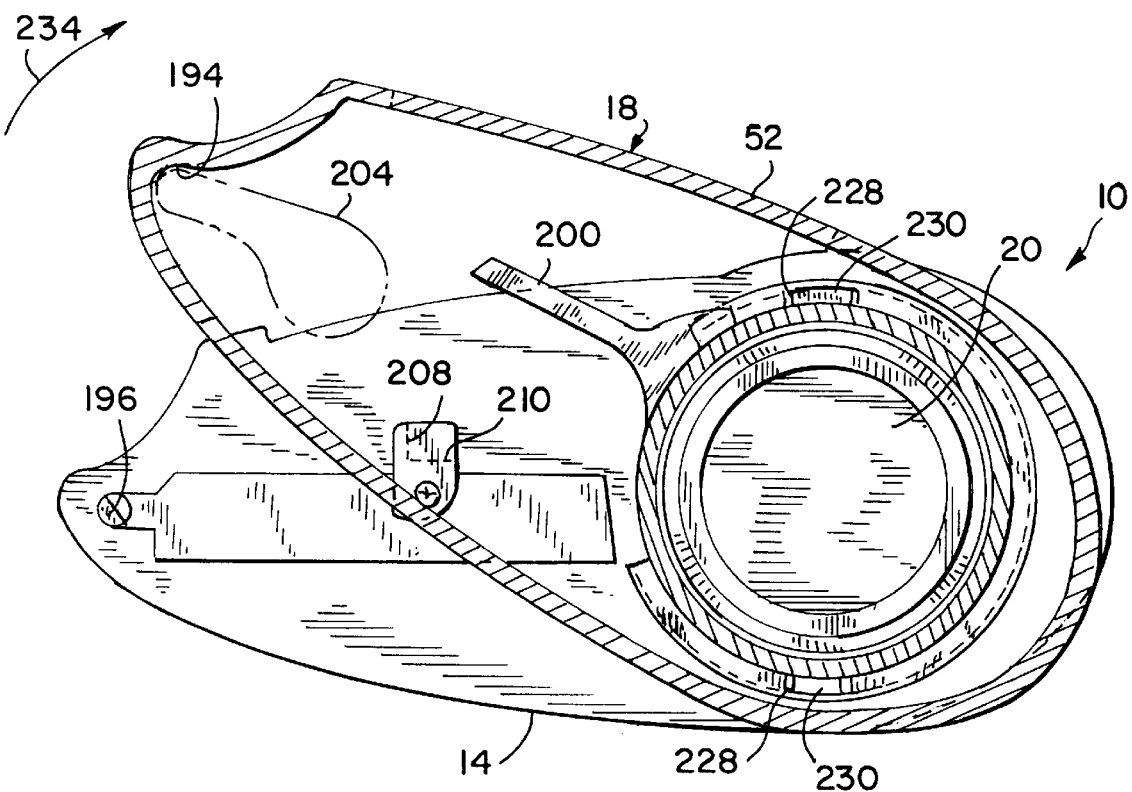
FIG. 8 is a sectional view of the reel of FIG. 7 illustrating the removable side assembly rotated out of engagement with the reel.

FIGS. 7 and 8 illustrate the disengagement of both rotational locking mechanism 58 and axial locking mechanism 60. FIG. 7 illustrates both rotational locking mechanism 58 and axial locking mechanism 60 in an engaged position. As shown by FIG. 7, in the engaged positions, pin 196 extends into detent 194 to prevent rotation of side cover 52 relative to frame 14. At the same time, bayonet tabs 230 are located within channel 226 adjacent channel 226. Consequently, rails 224 engage tabs 230 to retain side cover 52 against frame 14. Carrier guide 200 further engages carrier 202 to further retain side cover 52 against frame 14.

Rotational locking mechanism 58 and axial locking mechanism 60 are disengaged as follows. First, push button 203 is depressed against the biasing force of resilient element 206 to move pin 196 out of detent 194. While push button 203 remains depressed, side cover 52 is rotated in the direction indicated by arrow 234 so as to lift carrier 202 from channel 208 of carrier 200 and so as to further move openings 228 into alignment with bayonet tabs 230. In the position shown in FIG. 8, side cover 52 as well as the entire side assembly 18 including shaft 94 which supports spool assembly 20 is pulled away from frame 14.

Figure 9:
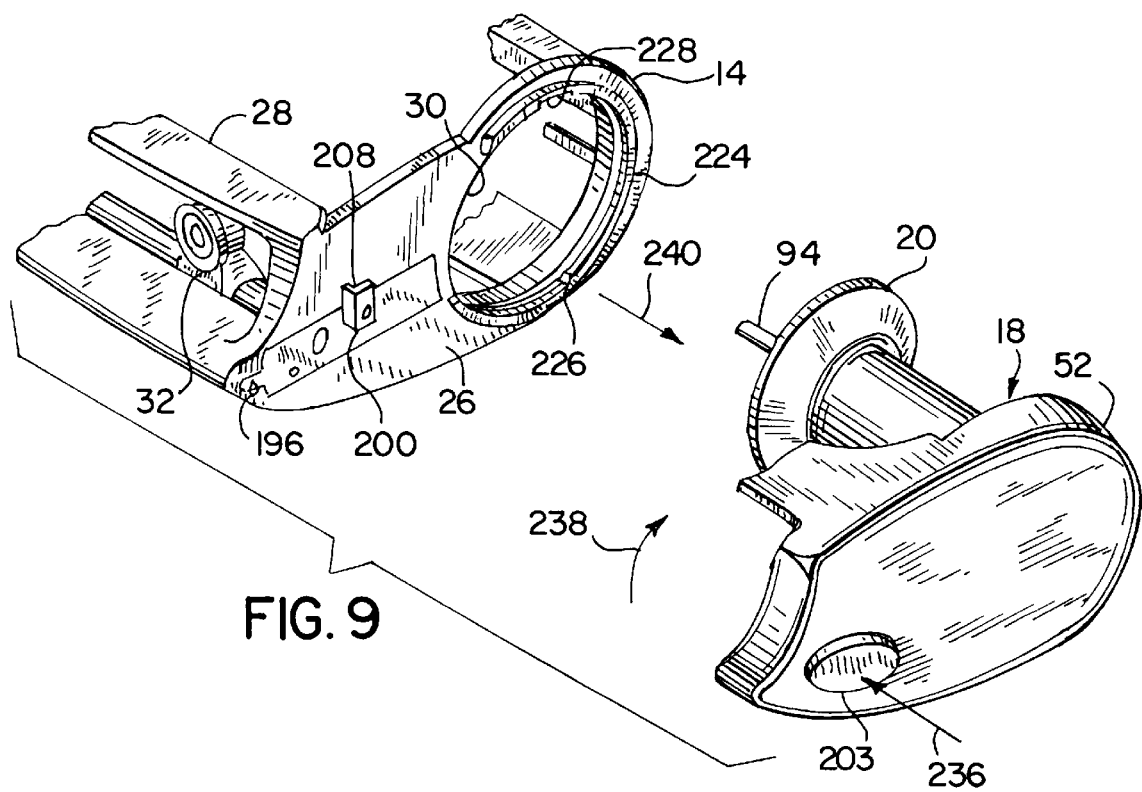
FIG. 9 is an enlarged fragmentary perspective view illustrating the removable side assembly separated from the reel.

FIG. 9 illustrates how side assembly 18, supporting spool assembly 20, may be separated and removed from frame 14 by three simple and quick manipulations while one hand remains in constant contact with side assembly 18. In particular, while holding on to side cover 52, push button 203 is depressed in the direction indicated by arrow 236. Next, side assembly 16 is rotated in the direction as indicated by arrow 238 about the axis of spool shaft 94. After being sufficiently rotated so as to align openings 228 with bayonet tabs 230 (not shown in FIG. 9). Side assembly 16 is separated from frame 14 by pulling side assembly 16 in the direction shown by arrow 240. As a result, spool shaft 94 and spool assembly 20 are separated from main side assembly 16 and are moved through opening 30. Thus, as shown by FIG. 9, side assembly 18 and spool assembly 20 may be easily separated from frame 14 for replacement of side assembly 18 or spool assembly 20 without the user removing his or her hand from side assembly 16. As a result, side assembly 18 may be easily removed and replaced with an alternate side assembly 18 carrying a different spool assembly 20 containing fishing line having a different length or gauge. Because spool assembly 20 remains axially mounted to shaft 94 and side cover 52 of side assembly 18 during the removal and separation of spool assembly 20 from reel 10, reel 20 is more easily removed and is less likely to be accidentally dropped into the water.

FIGS. 10 through 17 illustrate spool assembly 20 in greater detail. FIGS. 10 through 17 further illustrate the removal of spool assembly 20 from spool shaft 94. FIG. 10 is a sectional view of spool assembly 20 and main side assembly 16 as shaft 94 and spool assembly 20 are separated from side assembly 16 and moved through opening 30 of frame 14. FIG. 10 illustrates in greater detail the disengagement and removal of spool shaft 94 from side assembly 16 in the direction indicated by arrow 246. As best shown by FIG. 10, as side assembly 18 is pulled away from side assembly 16, engagement pin 120 is axially pulled through gear 178 and pin 98 is removed from slot 182 to separate end 112 of shaft 94 from side assembly 16. As shown by FIG. 11, pin 98 is simply pulled out of slot 182 during the separation of side assembly 18 from side assembly 16.

As shown by FIGS. 12 through 14, upon being separated from side assembly 16, spool assembly 20 and spool shaft 94 remain nonrotatably coupled and axially affixed relative to one another. As shown by FIG. 12, rotational locking structure 116 projects into corresponding keyways 166 of spool 132 to nonrotatably couple spool shaft 94 to spool 132.

As shown by FIGS. 13 and 14, resilient element 136 resiliently biases removable locking member 134 into an eccentric locking position in which movable locking member 134 projects into groove 124 of shaft 94 to axially retain spool 132 on shaft 94. Consequently, locking member 134 prevents spool 132 from accidentally falling off of spool shaft 94 once spool shaft 94 is separated from main side body 16.

FIGS. 15 through 17 illustrate the removal of spool assembly 20 from shaft 94. To remove spool assembly 20 from shaft 94, lever 170 is depressed in the direction indicated by arrow 250 to move member 134 against the biasing force of resilient element 136 so as to move locking member 134 out of groove 124, thus enabling spool assembly 20 to be axially moved off of shaft 94 in the direction indicated by arrow 254 as shown in FIG. 17. Thus, by simple depressment of lever 170, spool assembly 20 itself may be easily separated and removed from shaft 94 and side assembly 18 for replacement or exchange with another spool assembly 20 carrying fishing line having a different length or gauge. This feature enables the person fishing to easily replace the fishing line being used with fishing line having a proper reflected length and gauge best suited for the fishing conditions and the fish being sought.

Moreover, as shown by FIG. 2 and FIG. 17, spool assembly 20 is relatively simple, lightweight, compact and inexpensively manufactured. In particular, spool assembly 20 merely comprises a hollow tubular member having a central hub and two outer flanges, a movable locking ring captured in one end by a mounting plate and a coil spring for biasing the locking ring into a locking position. Spool assembly 20 does not include other more expensive and space occupying components such as a shaft or a braking mechanism. Thus, the person fishing may utilize a single bait cast fishing reel 10 having a main side guideassembly 16, a single side assembly 18 and a relatively large inventory of spool assemblies 20, each spool assembly carrying a different length or gauge of fishing line.

Although the present invention has been described with reference to preferred embodiments, workers skilled in the art will recognize that changes may be made in form and detail without departing from the spirit and scope of the invention. The present invention described with reference to the preferred embodiments and set forth in the following claims is manifestly intended to be as broad as possible. For example, unless specifically otherwise noted, the claims reciting a single particular element also encompass a plurality of such particular elements.

We claim:

1. A bait cast fishing reel comprising:
   a frame having a first side, a second side spaced from the first side, and a bridge interconnecting the first side and the second side;
   first side assembly disposed on the first side of the frame and including a drive train;
   a crank coupled to the drive train:
   a clutch coupled to the drive train:
   a second side assembly disposed on the second side of the frame, the second side assembly rotatably supporting a spool shaft having an axis and extending along the axis from the second side assembly to the first side and into engagement with the drive train of the first side assembly, wherein the second side assembly is configured to be separable from the frame and the first side assembly to disengage the spool shaft from the drive train of the first side assembly;
   a spool removably supported about the shaft:
   a first surface coupled to the shaft and extending non-parallel to the axis: and
   a second surface coupled to the spool and extending non-parallel to the axis into engagement with the first surface to prevent rotation of the spool and the shaft relative to one another about the axis.

2. The bait cast fishing reel of claim 1 wherein the spool shaft has an outer circumferential surface sized and configured to releasably support a spool.

3. The bait cast fishing reel of claim 1 including spool retention means for being actuated between a first position in which the means axially retains the spool on the shaft and a second position in which the spool is axially removable from the shaft.

4. The bait cast fishing reel of claim 1 wherein the spool includes:
   a tubular member having a central bore axially extending therethrough, the central bore sized to removably receive the shaft;
   a first shaft engaging surface extending from the tubular member in a direction non-parallel to the axis of the bore so as to engage the shaft to axially retain the spool on the shaft; and
   second shaft engaging surface extending in a direction nonperpendicular to the axis of the bore so as to engage the shaft to prevent rotation of the spool about the shaft.

5. The bait cast fishing reel of claim 1 including:
   a female portion on a first one of the spool and the shaft; and
   a male portion on a second one of the spool and the shaft, wherein the female portion and the male portion are movable relative to one another between an engaged position in which the spool is fixed axially to the spool and a disengaged position in which the spool can be moved along the axis relative to the shaft.

6. The bait cast fishing reel of claim 5 wherein the male portion and the female portion include surfaces which extend in a direction perpendicular to the axis of the shaft.

7. The bait cast fishing reel of claim 5 wherein the female and male portions are resiliently biased into the engaged position.

8. The bait cast fishing reel of claim 5 including a manually operable lever coupled to one of the male and female members to move said one of the male and female members between the engaged and disengaged positions.

9. The bait cast fishing reel of claim 5 wherein the female portion is coupled to the shaft and wherein the male portion is coupled to the spool.

10. The bait cast fishing reel of claim 9 wherein the female portion includes at least one shoulder circumferentially extending about the shaft.

11. The bait cast fishing reel of claim 9 wherein the male portion comprises an annular ring carried by the spool, wherein the ring is movable between a concentric position in which the ring is disengaged from the shaft and an eccentric position in which the ring engages the shaft.

12. A bait cast fishing reel comprising:
    a spool shaft extending along an axis and having a first end and a second end;
    a first surface coupled to the shaft and extending non-parallel to the axis;

first and second side assemblies rotatably supporting the first and second ends of the shaft, respectively, wherein the second side assembly is movable relative to the second end to expose the second end;

a second surface coupled to the first side assembly and extending non-parallel to the axis between the first surface and the second end in engagement with the first surface to axially fix the shaft to the first side assembly; and a spool having a central bore receiving the shaft, whereby the spool may be mounted onto the shaft or demounted from the shaft over the second end of the shaft without separating the shaft from the first side assembly.

13. A spool for a bait cast fishing reel having a shaft, the spool comprising:

a tubular member having a central bore extending along an axis completely therethrough from a first side of the spool to a second opposite side of the spool, the central bore sized to removably receive the shaft of the reel, whereby the spool permits the shaft to extend completely through the spool;

first shaft engaging surface extending from the tubular member in a direction oblique to the axis so as to engage the shaft to axially retain the spool on the shaft; and a second shaft engaging surface extending in a direction nonperpendicular to the axis of the bore so as to engage the shaft to prevent rotation of the spool about the shaft.

14. The spool of claim 13 wherein the first shaft engaging surface extends perpendicular to the axis of the bore.

15. The spool of claim 13 wherein the second shaft engaging surface extends parallel to the axis of the bore.

16. The spool of claim 13 wherein the first shaft engaging surface is movable between a first shaft engaging position and a second disengaged position.

17. The spool of claim 16 wherein the first shaft engaging surface is resiliently biased towards the first shaft engaging position.

18. The spool of claim 16 including a manual lever for moving the surface between the first and second positions, wherein the manual lever does not extend across the axis.

19. The spool of claim 16 including an annular ring carried by the spool, wherein the annular ring includes the first shaft engaging surface and wherein the ring moves between a first shaft engaging position and a disengaged position.

20. A bait cast fishing reel comprising:

a frame having a first side, a second side spaced from the first side, and a bridge interconnecting the first side and the second side;

a first side assembly disposed on the first side of the frame and including a drive train;

a crank coupled to the drive train;

a clutch coupled to the drive train;

a second side assembly disposed on the second side of the frame, the second side assembly rotatably supporting a spool shaft having an axis and extending along the axis from the second side assembly to the first side and into engagement with the drive train of the first side assembly, wherein the second side assembly is configured to be separable from the frame and the first side assembly to disengage the spool shaft from the drive train of the first side assembly; and a spool removably supported about the shaft, wherein the spool includes:

a tubular member having a central bore axially extending therethrough, the central bore sized to removably receive the shaft;

first shaft engaging surface extending from the tubular member in a direction perpendicular to the axis of the bore so as to engage the shaft to axially retain the spool on the shaft;

a second shaft engaging surface extending in a direction nonperpendicular to the axis of the bore so as to engage the shaft to prevent rotation of the spool about the shaft.

21. A bait cast fishing reel comprising:

a frame having a first side, a second side spaced from the first side, and a bridge interconnecting the first side and the second side;

a first side assembly disposed on the first side of the frame and including a drive train;

a crank coupled to the drive train;

a clutch coupled to the drive train;

a second side assembly disposed on the second side of the frame, the second side assembly supporting a spool shaft extending from the second side assembly to the first side assembly and into engagement with the drive train of the first side assembly, wherein the second side assembly is configured to be separable from the frame and the first side assembly to disengage the spool shaft from the drive train of the first side assembly;

a spool supported by the spool shaft;

means for rotatably coupling the second side assembly to the frame, wherein the second side assembly is rotated between a first position in which the second side assembly is fixed to the frame along the axis of the spool and a second position in which the second side assembly is separable from the frame; and means moveable between a first position in which the second side assembly is rotationally fixed to the frame and a second position in which the second side assembly is rotatable relative to the frame.

* * * * *